United States Patent
Reymond et al.

(10) Patent No.: US 9,397,551 B2
(45) Date of Patent: Jul. 19, 2016

(54) DEVICE FOR PROTECTING AGAINST AN ELECTRICAL OVERCURRENT IN AT LEAST ONE ELECTRONIC SWITCHING BRANCH, CONVERSION SYSTEM INCLUDING SUCH A PROTECTION DEVICE, AND ASSOCIATED CONTROL METHOD

(71) Applicant: SCHNEIDER ELECTRIC INDUSTRIES SAS, Rueil-Malmaison (FR)

(72) Inventors: Bruno Reymond, Moirans (FR); Maria Vallet, Meylan (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 252 days.

(21) Appl. No.: 14/107,365

(22) Filed: Dec. 16, 2013

(65) Prior Publication Data
US 2014/0177298 A1 Jun. 26, 2014

(30) Foreign Application Priority Data

Dec. 21, 2012 (FR) ...................................... 12 62618

(51) Int. Cl.
*H02M 1/32* (2007.01)
*H02M 3/158* (2006.01)
*H02M 3/156* (2006.01)
*H02M 7/5387* (2007.01)

(52) U.S. Cl.
CPC ................ *H02M 1/32* (2013.01); *H02M 3/156* (2013.01); *H02M 3/158* (2013.01); *H02M 7/5387* (2013.01); *H02M 2003/1586* (2013.01)

(58) Field of Classification Search
CPC ................ H02M 1/32; H02M 3/1584; H02M 2003/1586
USPC ........................................... 363/56.03, 56.04
See application file for complete search history.

(56) References Cited

U.S. PATENT DOCUMENTS

| 5,375,028 | A | | 12/1994 | Fukunaga et al. |
| 5,710,508 | A | * | 1/1998 | Watanabe ............... H03K 17/18 323/284 |
| 5,903,448 | A | * | 5/1999 | Davila, Jr. ......... H02M 3/33584 363/133 |
| 6,288,881 | B1 | | 9/2001 | Melvin et al. |
| 2003/0137858 | A1 | | 7/2003 | Tsuji et al. |
| 2011/0133817 | A1 | | 6/2011 | Brueckl et al. |

FOREIGN PATENT DOCUMENTS

CN                 201039049 Y        3/2008

OTHER PUBLICATIONS

French Preliminary Search Report issued Jun. 5, 2013, in French Application No. 12 62618 filed Dec. 21, 2012 (with English Translation of Categories of Cited Documents).

* cited by examiner

*Primary Examiner* — Timothy J Dole
*Assistant Examiner* — Ishrat Jamali
(74) *Attorney, Agent, or Firm* — Oblon, McClelland, Maier & Neustadt, L.L.P.

(57) ABSTRACT

This device protects at least one electronic switching branch of an electrical conversion system against an overcurrent, each branch comprising two switching half-branches serially connected at an intermediate terminal, at least one half-branch including a switching member, each switching member comprising a first controllable switch and a diode connected in antiparallel to the first switch. The protection device includes, for each switching branch, at least one second controllable switch, each second switch being connected to the intermediate terminal or to an electrode of said diode in antiparallel to the first switch, each second switch being able to switch, under action of a controller, from an on state to an off state to protect said diode from the overcurrent, means for measuring a magnitude relative to a current able to circulate in each diode, and means for controlling each second switch, based on the measured magnitude.

15 Claims, 7 Drawing Sheets

DEVICE FOR PROTECTING AGAINST AN ELECTRICAL OVERCURRENT IN AT LEAST ONE ELECTRONIC SWITCHING BRANCH, CONVERSION SYSTEM INCLUDING SUCH A PROTECTION DEVICE, AND ASSOCIATED CONTROL METHOD

BACKGROUND OF THE INVENTION

The present invention relates to a device for protecting against an electrical overcurrent, for at least one electronic switching branch of an electrical conversion system, the or each branch comprising two switching half-branches serially connected at an intermediate terminal, at least one half-branch including at least one switching member, the or each switching member comprising a first controllable electronic switch and a diode connected in antiparallel to said first electronic switch.

The invention also relates to a system for converting a first electrical voltage into a second electrical voltage comprising such a protection device.

The invention also relates to a method for controlling such a protection device.

The field of the invention is that of electrical power conversion systems. The invention in particular relates to electricity production installations comprising at least one electricity conversion system, in particular systems for producing electricity from photovoltaic modules.

A protection device of the aforementioned type is known. Such a protection device is used within a voltage inverter connected between a photovoltaic module, providing a direct electrical current, and a three-phase alternating network. The voltage inverter includes three switching branches, each branch comprising two electronic switches and two diodes. Each diode is connected in antiparallel with an electronic switch. The protection device comprises several electrical contactors and/or several circuit breakers, each contactor and/or circuit breaker being connected serially between a phase output of the inverter and the electrical network.

In nominal value operation, the value of the input voltage of the inverter, on the side of the photovoltaic module, is greater than the value of the output voltage of the inverter, on the network side. In that case, the electrical current circulates from the photovoltaic module toward the network, via the inverter.

When a fault occurs, such as an electrical short-circuit on the side of the photovoltaic module, or when the electrical power at the input of the inverter decreases abruptly, the input voltage of the inverter decreases suddenly and drops below the peak voltage of the network. In that case, the electrical current circulates from the network toward the photovoltaic module, via the inverter. If the intensity of the current circulating in each diode of the inverter exceeds its nominal operating intensity, the diode may break. However, if the decrease in the input voltage of the inverter occurs over very short period of time, typically less than the characteristic time constant of the converter, the latter is too slow to be able to open the electrical circuit and thereby prevent the diode from breaking.

To avoid this phenomenon, a first known solution consists of connecting an impedance serially between each phase output of the inverter and the electrical network. The value of this impedance is chosen so as to limit the presumed short-circuit current corning from the network. However, this first solution causes an online voltage drop at the phase outputs of the inverter, which also requires overdimensioning the apparent power of the inverter. This solution consequently leads to a deterioration in the overall output of the conversion system and excess production costs.

A second known solution is to connect the diode serially between the output of the photovoltaic modules and the input of the inverter. This solution, although satisfying the response time requirements for protection of the diodes, is not, however, satisfactory in terms of the loss of output that it creates. In fact, the presence of the diode at the input of the inverter causes a drop in the input voltage, and consequently a deterioration of the overall output of the conversion system.

A third known solution consists of using fuses within the protection device. Each fuse is then connected serially between a phase output of the inverter and the electrical network. As for the second solution, the third solution is also not satisfactory in terms of output, the fuses having to reach a relatively high temperature to operate correctly. Furthermore, the use of fuses causes significant operating costs.

SUMMARY OF THE INVENTION

One aim of the invention is therefore to propose a device for protecting at least one electronic switching branch making it possible to protect each diode of the branch against an electrical overcurrent, while having an improved activation speed and substantially preserving the output of the branch.

To that end, the invention relates to a protection device of the aforementioned type, in which the device includes, for the or each switching branch:
- at least one second electronic switch, the or each second electronic switch being connected to the intermediate terminal or to an electrode of said diode connected in antiparallel to the first electronic switch, the or each second electronic switch being able to switch, under the action of a controller, from an on state to an off state to protect said diode from the overcurrent,
- measuring means for measuring at least one magnitude relative to a current able to circulate in the or each diode of the branch, and
- control means for controlling the or each second electronic switch, based on the magnitude measured by the measuring means.

According to other advantageous aspects of the invention, the protection device comprises one or more of the following features, considered alone or according to all technically possible combinations:
- the or each second electronic switch is serially connected to a respective diode, and connected in antiparallel to a first respective electronic switch;
- for the or each switching branch, the second electronic switch is connected on the one hand to the intermediate terminal of that switching branch, the second electronic switch being capable of being connected on the other hand to an output terminal of the electrical conversion system;
- the or each second switch includes a semiconductor electronic switching component, such as a transistor, and a nonlinear electrical component connected in parallel to said semiconductor switching component;
- the or each second electronic switch includes a nonlinear electrical component, and two arms each connected in parallel to the nonlinear electrical component, each arm including a semiconductor electronic switching component, such as a transistor, and a diode serially connected to the semiconductor switching component;
- the or each second electronic switch includes two arms, a first arm comprising two diodes serially connected by their respective cathodes at a first connection point, a second arm comprising two diodes serially connected by their respective anodes at a second connection point, and the or each second electronic switch further includes a nonlinear electrical component connected between the first and second connection points, and a semiconductor electronic switching component, such as a transistor, the semiconductor electronic switching component being connected in parallel with the nonlinear electrical component;

the or each second electronic switch includes two arms, a first arm comprising two diodes serially connected by their respective cathodes at first connection point, a second arm comprising two diodes serially connected by their respective anodes at a second connection point, and the or each second electronic switch further includes a nonlinear electrical component connected between the first and second connection points, a mechanical contactor, connected in parallel with the nonlinear electrical component, and a semiconductor electronic switching component, such as a transistor, connected in parallel with the nonlinear electrical component.

The invention also relates to a system for converting a first electrical voltage into a second electrical voltage, comprising:

a converter for converting a first electrical voltage into a second electrical voltage, the converter comprising at least two input terminals, at least two output terminals, and at least one electronic switching branch connected between the two input terminals, the or each branch comprising two switching half-branches serially connected at an intermediate terminal, at least one half-branch including at least one switching member, the or each switching member comprising a first controllable electronic switch and a diode connected in antiparallel with said first electronic switch;

a control device for controlling the or each first electronic switch of the or each branch, and a protection device for protecting the or each branch against an electrical overcurrent, wherein the protection device is as defined above.

The invention also relates to a method for controlling a protection device, the protection device being capable of protecting at least one electronic switching branch of electrical conversion system against an electrical overcurrent, the or each branch comprising two switching half-branches serially connected at an intermediate terminal, at least one half-branch including at least one switching member, the or each switching member comprising a first controllable electronic switch and a diode connected in antiparallel with said first electronic switch, the protection device comprising, for the or each switching branch, at least one second electronic switch connected to the intermediate terminal or to an electrode of said diode connected in antiparallel with the first electronic switch, the or each second electronic switch being capable of switching, under the action of a command, from an on state to an off state to protect said diode against the overcurrent, wherein the method comprises, for the or each second electronic switch, the following steps:

measuring, for the or each diode capable of being protected by said second switch, at least one magnitude relative to the current circulating in that diode, controlling the or each second electronic switch based on the magnitude measured by the measuring means.

According to other advantageous features of the invention, the method comprises one or more of the following features, considered alone or according to all technically possible combinations:

the step for controlling the or each second electronic switch comprises:
    comparing the or each received measurement to a predetermined reference magnitude or another received measurement, and
    emitting an opening or closing control signal to open or close the or one of the second electronics switch(es) based on the result of the comparison;

during the measuring step, the measurement is a direct measurement of the intensity of the current circulating in the or each diode of the or each branch, the comparison step consists of a comparison between the value of the measured intensity of the current circulating in at least one of the diodes capable of being protected by said second switch and the value of a reference intensity, and, during the step for emitting a control signal, the control signal is an opening control signal when the deviation between the measured intensity of the current circulating in said at least one diode and the reference intensity is above a predetermined gap;

during the measuring step, the measurement is a measurement of the intensity of the current circulating in the or each diode of the or each branch, via a measurement of the intensity of a main current comprising the current circulating in said diode, and the comparison step consists of a comparison between the value of the intensity of the main measured current and a zero value;

during the measuring step, the measurement is a measurement of the intensity of the current circulating in the or each diode of the or each branch and the derivative of the intensity of the current circulating in the or each diode of the or each branch, the comparison step consists of a comparison between the sign of the value of the intensity of the current circulating in at least one of the diodes capable of being protected by said second switch and the sign of the value of the derivative of the intensity of the current circulating in that diode and, during the step for emitting a control signal, the control signal is an opening control signal, when the value of the intensity of the current circulating in said at least one diode and the value of the derivative of that intensity have the same sign;

the opening control signal is sent to the or each second electronic switch, and is capable of commanding the simultaneous opening of all of the second electronic switches of the conversion system;

when the control signal of the or one of the second electronics switch(es) is an opening control signal, the control step further comprises the emission of a forced opening control signal of the or one of the first electronic switch(es).

BRIEF DESCRIPTION OF THE DRAWINGS

These features and advantages of the invention will appear upon reading the following description, provided solely as a non-limiting example, and done in reference to the appended drawings, in which:

FIG. 6 is an electrical diagram of one alternative of one of the electronic switches of the protection device according to FIG. 5.

DETAILED DESCRIPTION OF PREFERRED EMBODIMENTS

Figure 1:
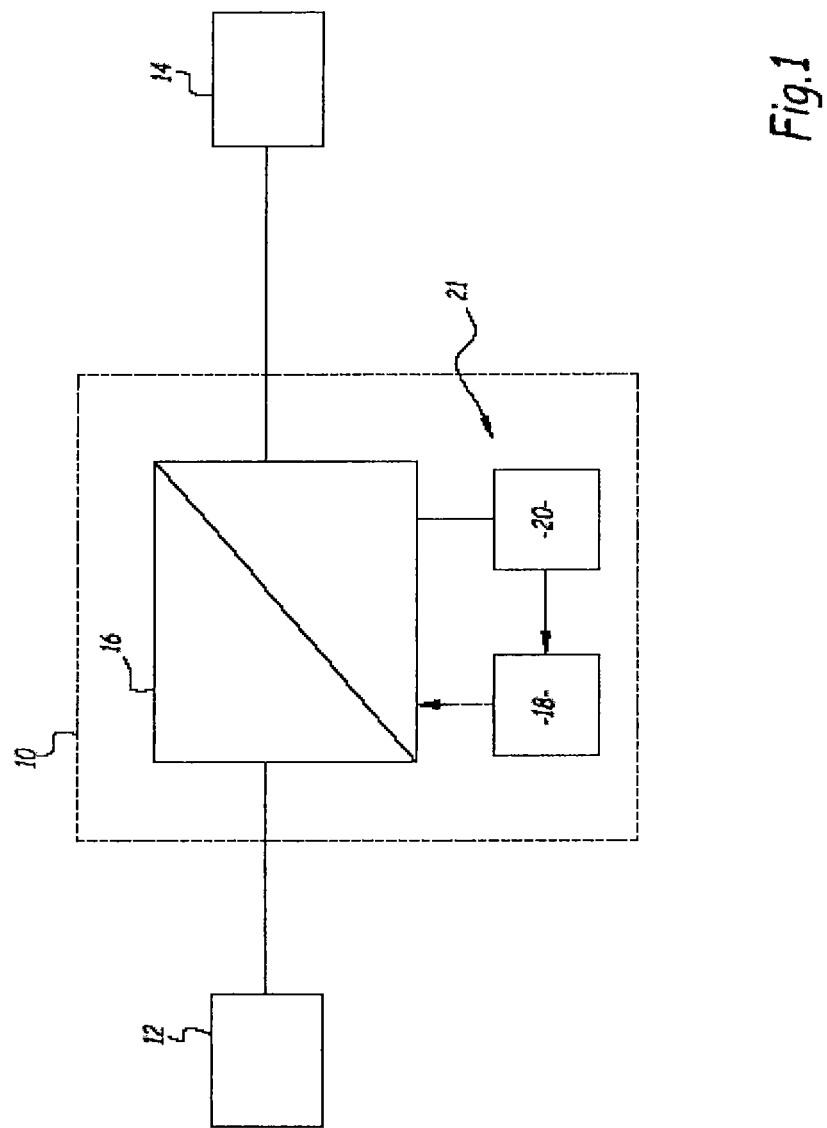
FIG. 1 is a diagrammatic view of a conversion system according to the invention, connected between a source supplying the first electrical voltage and a load having a second electrical voltage between its terminals.

FIG. 1 shows a system 10 for converting a first electrical voltage into a second electrical voltage. The conversion system 10 is connected on the one hand to a source 12 supplying the first electrical voltage, and on the other hand to a load 14 debiting the second electrical voltage between its terminals.

The conversion system 10 comprises a converter 16 for converting the first electrical voltage into the second electrical voltage. This converter 16 is connected between the source 12 and the load 14.

The conversion system 10 also comprises a device 18 for controlling the converter 16, means 20 for measuring a magnitude relative to at least one current circulating within the converter 16, and a device 21 for protecting the converter 16 against an electrical overcurrent.

The source 12 is for example a direct current source. In the example embodiment of FIG. 2, the direct current source 12 is formed by an installation 22 of photovoltaic modules connected to a positive DC voltage bus 24A and a negative DC voltage bus 24B. It has a rated voltage for example comprised between 600 Vcc and 800 Vcc. Alternatively, the direct current source 12 is formed by an electricity storage device, such as a battery, for example.

The load 14 is for example a polyphase electrical network. The electrical network 14 is, in the example embodiment of FIG. 2, a 3-phase alternating network with a voltage for example equal to 240 V neutral phase or 380 Vac between phases. According to this example embodiment, the converter 16 is a voltage inverter, capable of converting a direct input voltage into a three-phase alternating output voltage, and the conversion system 10 is a system for converting a direct input voltage into a three-phase alternating output voltage.

The converter 16 includes at least two input terminals 26A, 26B and at least two output terminals 28U, 28V, 28W. In the example embodiment of FIG. 2, the voltage inverter 16 includes a positive input terminal 26A, a negative input terminal 26B, and three output terminals 28U, 28V, 28W. Each output terminal 28U, 28V, 28W corresponds to a respective phase of the three-phase alternating output voltage that can be delivered by the inverter 16.

The voltage inverter 16 includes, for each output terminal 28U, 28V, 28W corresponding to a respective phase U, V, W, a switching branch 30 connected between the two input terminals 26A, 26B.

Each switching branch 30 comprises two switching half-branches 32A, 32B serially connected at a respective intermediate terminal 34U, 34V, 34W. The voltage inverter 16 thus includes three intermediate output terminals 34U, 34V, 34W. Each intermediate output terminal 34U, 34V, 34W corresponds to a respective phase of the three-phase alternating output voltage that can be delivered by the inverter 16. In the example embodiment of FIG. 2, each intermediate output terminal 34U, 34V, 34W is connected to a respective output terminal 28U, 28V, 28W, via a wired connection 35U, 35V, 35W.

Each first half-branch 32A is connected between the positive input terminal 26A and a respective intermediate output terminal 34U, 34V, 34W. Each second half-branch 32B is connected between the negative input terminal 26B and a respective intermediate output terminal 34U, 34V, 34W.

Each half-branch 32A, 32B comprises a switching member 36. In one alternative not shown, each half-branch 32A, 32B comprises a number N1 of switching members 36, N1 being an integer greater than or equal to two. This alternative for example corresponds to a "buck" converter 16.

Also alternatively, for each switching branch 30, only one half-branch 32A, 32B includes a number N2 of switching members, N2 being an integer greater than or equal to one. This alternative for example corresponds to a converter 16 having a multi-level structure.

As known per se, each switching member 36 is bidirectional in current and unidirectional in voltage. Each switching member 36 comprises a first controllable electronic switch 37 and a diode 38 connected in antiparallel, thereby ensuring bidirectional current circulation paths.

Each first switch 37 is for example formed by an insulated gate bipolar transistor (IGBT). All of the IGBT transistors 37 are, for example, identical. The gate of each IGBT 37 is connected to the control device 18 to receive a corresponding control signal.

Alternatively, the IGBT 37 is replaced by any semiconductor electronic component comprising a control electrode and two conduction electrodes, such as a bipolar transistor, a field effect transistor, a thyristor, a gate turnoff thyristor, an IGCT (Insulated Gate-Commutated Thyristor), or a MCT (MOS Controlled Thyristor), for example.

The control device 18 is connected to each of the first electronic switches 37, as previously indicated, and is capable of sending control signals to said first switches 37.

The measuring means 20 are arranged within the protection device 21. In the example embodiment of FIG. 2, the measuring means 20 comprise a measuring member 44. The measuring member 44 is advantageously arranged between the installation 22 and the positive input terminal 26A, on the positive DC voltage bus 24A.

Figure 2:
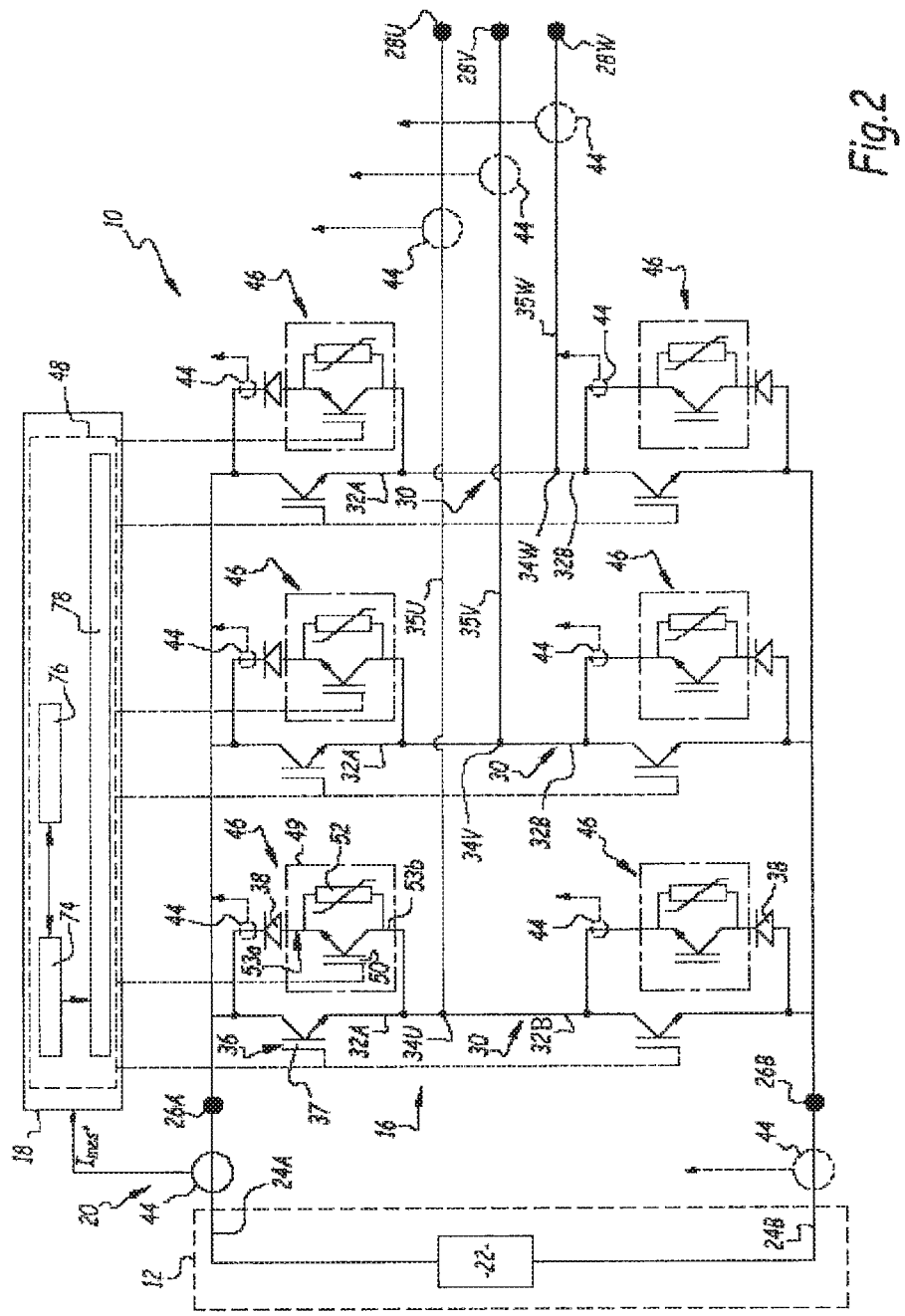
FIG. 2 is an electrical diagram of the conversion system of FIG. 1 according to a first embodiment, including a three-phase inverter comprising three switching branches and a protection device according to the invention, the device protecting each switching branch and comprising six electronic switches.

Alternatively, the measuring member 44, shown in dotted lines in the bottom left of FIG. 2, is arranged between the insulation 22 and the negative input terminal 26B, on the negative DC voltage bus 24B.

Also alternatively, the measuring means 20 comprise three measuring members 44, shown in dotted lines on the right side of FIG. 2. Each measuring member 44 is arranged between a respective intermediate output terminal 34U, 34V, 34W and an associated output terminal 28U, 28V, 28W, on a corresponding wired link 35U, 35V, 35W. According to this alternative embodiment, each measuring member 44 is capable of measuring the intensity of the current circulating in a wired link 35U, 35V, 35W, as outlined hereafter.

In the three example embodiments described above, the measuring member 44 is preferably a current sensor integrated by default within the voltage inverter 16. Alternatively the measuring member 44 is an additional current sensor, for example a sensor of the "shunt" type or a Hall sensor or a Rogowski sensor, these sensors being known.

Also alternatively, the measuring means 20 comprise six measuring members 44, shown in dotted lines at the center of FIG. 2. Each measuring member 44 is arranged at a switching half-branch 32A, 32B, on the antiparallel connection of a respective diode 38. According to this alternative embodiment, each measuring member 44 is capable of measuring the intensity of the current circulating in the associated diode 38, as outlined hereinafter. According to this alternative embodiment, the measuring member 44 is for example an additional current sensor of the aforementioned type or a current sensor integrated into the IGBT 37 of the associated half-branch 32A, 32B.

In the example embodiment of FIG. 2, the measuring member 44 is capable of measuring the intensity of the current circulating in the positive DC voltage bus 24A, and providing a video signal $I_{mes+}$, of that measurement.

For each switching branch 30, the measuring means 20 are capable of measuring at least one magnitude relative to the current capable of circulating in each diode 38 of that branch 30, and sending that measurement to the control device 18. In the example embodiment of FIG. 2, the measured magnitude is the intensity of the current circulating in the positive DC voltage bus 24A. The measured intensity of the current circulating in the positive bus 24A at a given moment is relative to the current capable of circulating in each diode 38 of the inverter 16. In fact, the current circulating in the positive bus 24A at a given moment is formed by the sum of the currents circulating in the three switching branches 30 at that time. Consequently, at a given moment, the current circulating in the positive bus 24A may have, as component, the current circulating within one of the diodes 38 of a switching branch 30, if that diode 38 is on at that moment. The measuring means 20 are thus capable of performing an indirect measurement of the current capable of circulating in each diode 38 of each branch 30.

Aside from the measuring means 20, the protection device 21 comprises as many second electronic switches 46 as there are first switches 37. More specifically, the protection device 21 comprises two second electronic switches 46 for each switching branch 30, each second electronic switch 46 being serially connected to the diode 38 of a respective switching half-branch 32A, 32B.

In one alternative not shown, the protection device 21 comprises three second electronic switches 46. More specifically, according to this alternative embodiment, the protection device 21 comprises, for each switching branch 30, a second electronic switch 46. Each second electronic switch 46 is for example serially connected with the diode 38 of one of the first switching half-branches 32A, and is connected in parallel with the first electronic switch 37 associated with that diode 38. Alternatively, each of the second electronic switches 46 is connected in parallel with the first electronic switch 37 of one of the second switching half-branches 32B.

The protection device 21 also comprises means 48 for controlling each second electronic switch 46.

In the example embodiment of FIG. 2, each second electronic switch 46 includes a cell 49. The cell 49 comprises an IGBT 50, a varistor 52 connected in parallel to the IGBT 50 a first connection terminal 53A connected to the transmitter of the IGBT 50, and a second connection terminal 53B connected to the collector of the IGBT 50.

Each cell 49 is arranged in a switching half-branch 32A, 32B such that its first connection terminal 53A is connected to the anode of the associated diode 38, or its second connection terminal 53B is connected to the cathode of the associated diode 38. In the example embodiment of FIG. 2, three cells 49 are arranged in the first half-branches 53A such that their first connection terminal 53A is connected to the anode of an associated diode 38, and three cells 49 are arranged in the second half-branches 53B such that their second connection terminal 53B is connected to the cathode of an associated diode 38.

Alternatively, the IGBT 50 is replaced by any semiconductor electronic component comprising a control electrode and two conduction electrodes, such as a bipolar transistor, a field effect transistor, a thyristor, a gate turnoff thyristor, an IGCT (Insulated Gate-Commutated Thyristor), or a MCT (MOS Controlled Thyristor), for example.

Alternatively or additionally, the varistor 52 is replaced by any nonlinear electrical component, such as a trisil diode, a transil diode, a low current caliber fuse, a nonlinear metal resistance, a resistance with a positive temperature coefficient, or a component formed by a combination of these elements. Also alternatively, the varistor 52 is replaced by a unit formed by a nonlinear electrical component of the aforementioned type and a switching assistance capacitor, connected in parallel to the component.

Figure 3:
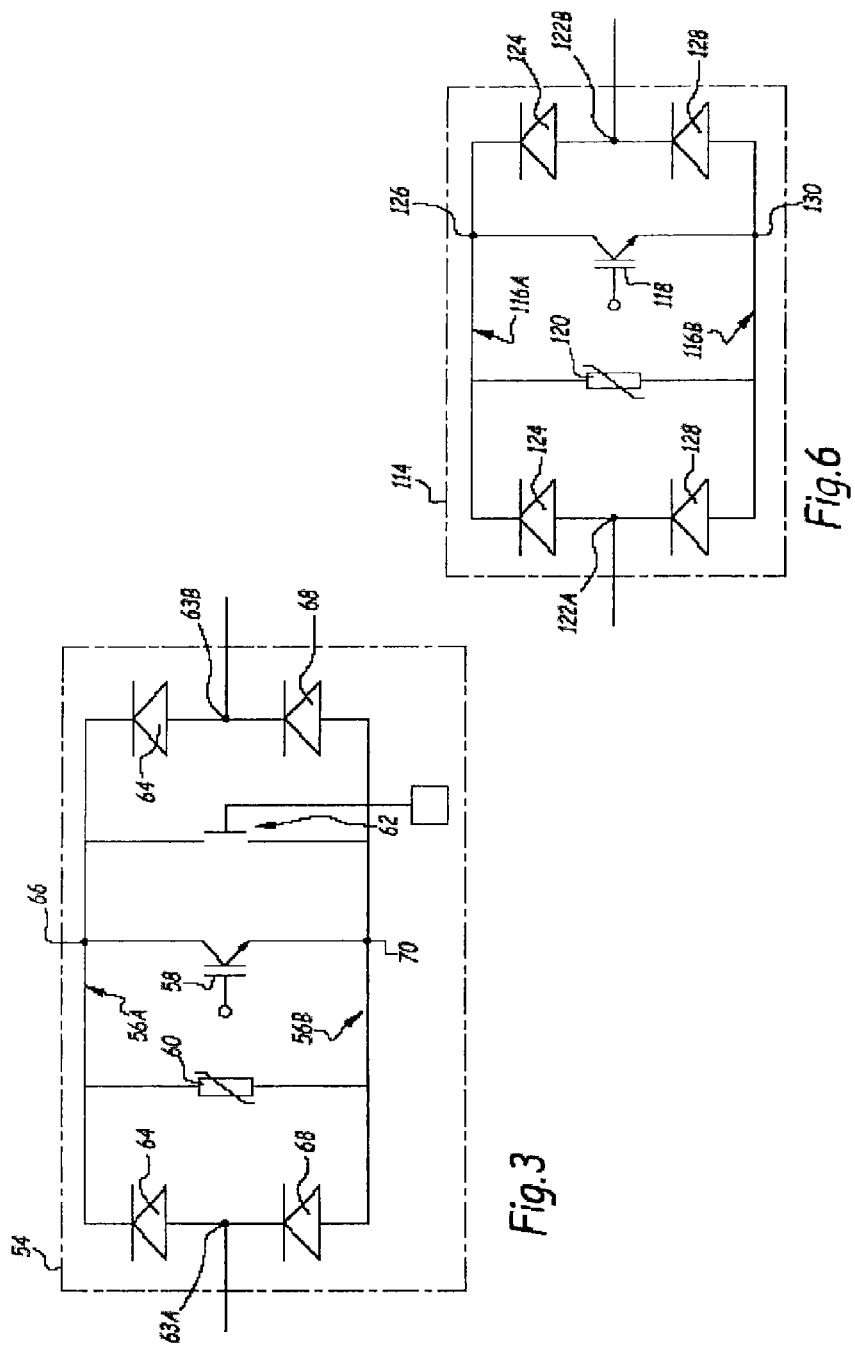
FIG. 3 is an electrical diagram of one alternative embodiment of one of the electronic switches of the protection device of FIG. 2.

According to one alternative embodiment shown in FIG. 3, each cell 49 is replaced by a hybrid assisted turnoff switch 54, as described in document U.S. Pat. No. 4,700,256 A. Such a hybrid assisted turnoff switch makes it possible to reduce the conduction losses, and to thereby improve the output of the inverter 16.

As known per se, the hybrid assisted turnoff switch 54 includes two arms 56A, 56B, an IGBT 58, a varistor 60 and a mechanical contactor 62.

The two arms 56A, 56B are connected to each other at two connection terminals 63A 63B. A first connection terminal 63A of the switch 54 is similar to the first connection terminal 53A of the cell 49. A second connection terminal 63B of the switch 54 is similar to the second connection terminal 53B of the cell 49.

A first arm 56A comprises two first diodes 64 serially connected by the respective cathode at a first connection point 66. A second arm 56B comprises two second diodes 68 serially connected by their respective anode at a second connection point 70.

The collector, the transmitter of the IGBT 58, respectively, is connected to the first connection point 66, the second connection point 70, respectively. The varistor 60 is connected in parallel with the IGBT 58. The mechanical contactor 62 is connected in parallel with the IGBT 48 and the varistor 60.

Alternatively, the IGBT 58 is replaced by any semiconductor electronic component comprising a control diode and two conduction electrodes, such as a bipolar transistor, a field effect transistor, a thyristor, a gate turnoff thyristor, an IGCT (Insulated Gate-Commutated Thyristor), or a MCT (MOS Controlled Thyristor), for example.

Alternatively or additionally, the varistor 60 is replaced by any nonlinear electrical component, such as a trisil diode, a transil diode, a low current caliber fuse, a nonlinear metal resistance, a resistance with a positive temperature coefficient, or a component formed by a combination of those elements. Also alternatively, the varistor 60 is replaced by a unit formed by a nonlinear electrical component of the aforementioned type and a switching assistance capacitor, connected with the component in parallel.

Each second electronic switch 46 is capable of switching, under the action of the control means 48, from an on state to an off state.

The control means 48 are advantageously arranged inside the control device 18 and are connected to the measuring means 20, as illustrated in FIG. 2. The control means 48 are further connected to each of the second electronic switches 46, and are capable of sending control signals to said second electronic switches 46. More specifically, the control electrode of each second electronic switch 46 is connected to the control means 48 to receive a corresponding control signal.

The control means 48 include an information processing unit for example formed by a data processor 74 associated with a memory 76. The control means 48 further include at least one control member connected to the processor 74. In the example embodiment of FIG. 2, the control means 48 include a single control member 78 capable of sending a control signal to six second electronic switches 46. In this example embodiment, the control signal is capable of commanding simultaneous opening or closing for the six electronic switches 46.

The control member 78 is for example a control card integrated by default within the control device 18 of the voltage inverter 16. Alternatively, the control member 78 is an additional control card dedicated to controlling the second electronic switches 46.

Also alternatively, the control means 48 include six control members, each control member being capable of sending a control signal to one of the second electronic switches 46 and being made up of a specific control card. Each control signal is capable of controlling the opening or closing of the associated second electronic switch 46. This alternative embodiment makes it possible to improve the configurability of the control means 48.

The processor 74 is capable of comparing the value of the signal $I_{mes+}$, to a reference value and sending a control order to the control member 78. In the example embodiment of FIG. 2, the processor 74 is capable of comparing the value of the signal $I_{mes+}$ to a zero value, and sending an opening control order to the control member 78 if the signal $I_{mes+}$, has a negative value.

The memory 76 is capable of storing a reference value. In the example embodiment of FIG. 2, the memory 76 is capable of storing the zero value.

The control means 48 are capable of controlling the passage of each second electronic switch 46 from its on state to its off state, based on the magnitude measured by the measuring means 20, in this case the intensity of the current circulating in the positive DC voltage bus 24A in the example embodiment of FIG. 2.

The protection device 21 is capable of protecting each switching branch 30 against electrical overcurrent. More particularly, in the example embodiment of FIG. 2, each second electronic switch 46 is capable, by going from the on state to its off state, of protecting a diode 38 from electrical overcurrent.

The operation of the protection device 21 according to the invention will now be explained.

In nominal operation, the value of the input voltage of the inverter 16 is greater than the value of the output voltage of the inverter 16. The installation 22 of photovoltaic modules then powers the electrical network 14, via the inverter 16. The operation of the first electronic switches 37 being known in itself, it will not be described in more detail hereinafter.

It is assumed that at a first given moment, a fault occurs, for example a fault of the electrical short-circuit type, on the installation 22 site. The value of the input voltage of the inverter 16 decreases abruptly and drops below the peak voltage value of the network 14. From that first moment, a fault current circulates in at least two diodes 38 belonging to two distinct switching branches 30, a first diode 38 belonging to a first half-branch 32A of a switching branch 30, and a second diode 38 belonging to a second half-branch 32B of another switching branch 30. Furthermore, due to the presence of the electrical fault, the intensity of the fault current circulating within the two diodes 38 increases in absolute value over time. Due to the circulation of a current of increasing intensity in absolute value within the two diodes 38, the intensity of the current circulating in the positive bus 24A has a negative value as of a second moment.

Figure 4:
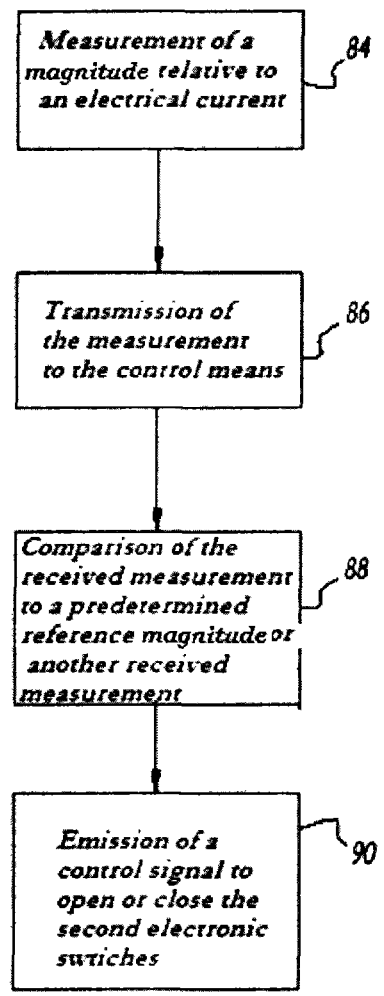
FIG. 4 is a flowchart showing a method for controlling the protection device according to the invention.

FIG. 4 shows the steps of a method for controlling the protection device 21, implemented by the protection device 21.

During an initial step 84, the member 44 measures the intensity of the current circulating in the positive DC voltage bus 24A.

During a following step 86, the measuring member 44 sends the signal $I_{mes+}$ to the control means 48. The signal $I_{mes+}$ has a negative value.

During a following step, the control means 48 control all of the second electronic switches 46 based on the value of the signal $I_{mes+}$.

More specifically, during a first sub-step 88 of the control step, the processor 74 compares the value of the signal $I_{mes+}$ to the reference value stored in the memory 76. More particularly, the processor 74 compares the value of the signal $I_{mes+}$ to the zero value. The signal $I_{mes+}$ having a negative value, the processor 74 then sends an opening control order for the second switches 46 to the control member 78.

During a second sub-step 90 of the control step, the control member 78 emits an opening control signal for each of the second electronic switches 46. Under the action of the control signal, all of the second electronic switches 46 then simultaneously go from their on state to their off state. More specifically, under the action of the control signal, the IGBT 50 of each second switch 46 goes from its on state to its off state. The varistor 52 of the second switch 46 then generates a voltage lower than the breakdown voltage of the IGBT 50, thereby stopping the passage of any current circulating in the associated diode 38. In particular, the fault current then no longer circulates in any of the diodes 38 of the inverter 16.

Furthermore, during this same second sub-step 90, the control member 78 emits a forced opening signal to each of the first electronic switches 37.

In the alternative embodiment according to which the second switch 46 is formed by a hybrid turnoff switch 54, the application of the opening control signal, during the second sub-step 90, to each second electronic switch 46, comprises a first step for controlling opening of the mechanical contactor 62, then, when the mechanical contactor 62 is open, a second step commanding opening of the IGBT 58. Relative to the cell 49, the hybrid turnoff switch 54 makes it possible to improve the overall output of the inverter 16, because of the presence of the mechanical contactor 62, which reduces the voltage drop across the terminals of the switch 54.

In the alternative according to which the measuring member 44 is arranged on the negative DC voltage bus 24B, the intensity of the current circulating in the negative bus 24A has a positive value as of the second moment. Furthermore, according to this alternative, the processor 74 is capable of sending an opening control order to the control member 78 if the video signal of the intensity of the current circulating in the negative bus 24A has a positive value. The signal having a positive value as of that second moment, the processor 74 then sends an opening control order for the second switches 46 to the control member 78 during the first sub-step 88.

Thus, according to this first embodiment of the conversion system 10, once the intensity of the fault current circulating within a diode 38 increases in absolute value over time, all of the diodes 38 of the inverter 16 are protected, by simultaneously opening the second electronic switches 46 of the device 21. Furthermore, the opening of the second switches 46 being controlled by the control means 48, the total activation time of the protection device 21 only depends on the reaction time of the measuring means 20 and the control means 48, the reaction time of the protection device 21, and the switching time of the second electronic switches 46. This activation time is, in any case, much shorter than the characteristic time constant of the contactors, circuit breakers and fuses of the prior art. In fact, the total duration is deterministic and does not depend on the current level, which is the case for the devices of the prior art.

Furthermore, according to this embodiment, each second electronic switch 46 is connected in parallel with a first respective switch 37. The overall output of the conversion system 10 is therefore not affected, despite the inherent voltage drop at the switches 46. In fact, during switching of the switches 46, the electricity is provided by the alternating network 14.

One can see that the protection device 21 according to the invention makes it possible to protect each diode 38 of each branch 30 against electrical overcurrent, while having an improved activation speed and substantially preserving the output of the branches 30.

Figure 5:
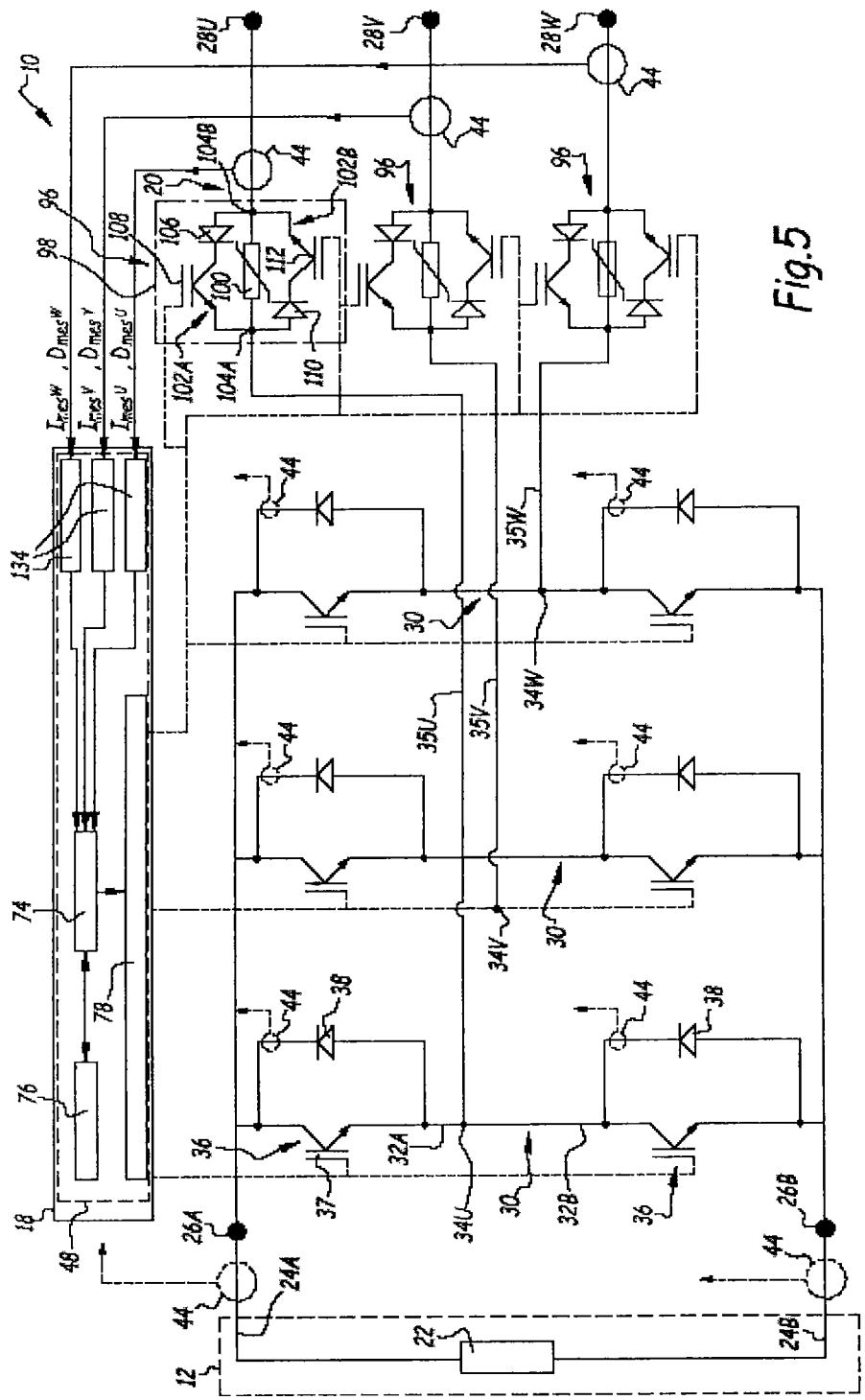
FIG. 5 is a view similar to that of FIG. 2 according to a second embodiment of the invention, the conversion system including a three-phase inverter comprising three switching branches, and a protection device according to the invention, the device protecting each switching branch and comprising three electronic switches, three current sensors and three modules for detecting an electrical overcurrent.

FIG. 5 illustrates a second embodiment of the invention for which the elements similar to the first embodiment, previously described, are identified using identical references, and are therefore not described again.

The measuring means 20 comprise three measuring members 44. Each measuring member 44 is arranged between a respective intermediate output terminal 34U, 34V, 34W and an associated output terminal 28U, 28V, 28W, over a corresponding wired link 35U, 35V 35W. Each measuring member 44 is capable of measuring the intensity of the current circulating in a wired link 35U, 35V, 35W and providing a video signal $I_{mesU}$, $I_{mesV}$, $I_{mesW}$ of that measurement. Additionally, each measuring member 44 is further advantageously capable of measuring the derivative of the intensity of the current circulating in a wired link 35U, 35V, 35W, and providing a video signal $D_{mesU}$, $D_{mesV}$, $D_{mesW}$ of that measurement. The signal $D_{mesU}$, $D_{mesV}$, $D_{mesW}$ respectively, corresponds to the time derivative of the signal $I_{mesU}$, $I_{mesV}$, $I_{mesW}$ respectively.

According to this second embodiment, the magnitude measured by the measuring means 20 is the intensity of the current circulating in a wired link 35U, 35V, 35W. The measured intensity of the current circulating in a wired link 35U, 35V, 35W at a given moment is relative to the current capable of circulating in each diode 38 of the switching branch 30 associated with that wired link. In fact, the current circulating in a wired link 35U, 35V, 35W at a given moment is the current circulating at that moment in the switching branch 30 associated with that wired link. Consequently, at a given moment, the current circulating in a wired link 35U, 35V, 35W is capable of having, as component, the current circulating within one of the diodes 38 of the associated switching branch 30, if that diode 38 is on at that moment. The measuring means 20 are thus capable of performing an indirect measurement of a current capable of circulating in each diode 38 of each branch 30.

The protection device 21 comprises three second electronic switches 96. More specifically, the protection device 21 comprises, for each switching branch 30, a second electronic switch 96 connected between the intermediate output terminal 35U, 35V, 35W of that branch 30 and the associated output terminal 28U, 28V, 28W. Each second electronic switch 96 is capable, by going from its on state to its off state, of protecting the two diodes 38 of the associated branch 30 from an electrical overcurrent.

In the example embodiment of FIG. 5, each second electronic switch 96 includes a cell 98. The cell 98 includes a varistor 100, two arms 102A, 102B each connected in parallel with the varistor 100. The two arms 102A, 102B are connected to each other at a first connection terminal 104A connected to an intermediate output terminal 34U, 34V, 34W, and a second connection terminal 104B connected to an output terminal 28U, 28V, 28W.

A first arm 102A comprises a first diode 106 and a first IGBT 108 connected in series. In the example embodiment of FIG. 5, the transmitter of the first IGBT 108 is connected to the first connection terminal 104A, the cathode of the first diode 106 is connected to the collector of the first IGBT 108, and the anode of the first diode 106 is connected to the second connection terminal 104B. In an alternative that is not shown, the cathode of the first diode 106 is connected to the first connection terminal 104A, the transmitter of the first IGBT 108 is connected to the anode of the first diode 106, and the collector of the first IGBT 108 is connected to the second connection terminal 104B.

A second arm 102B comprises a second diode 110 and a second IGBT 112 connected in series. In the example embodiment of FIG. 5, the transmitter of the second IGBT 112 is connected to the second connection terminal 104B, the cathode of the second diode 110 is connected to the collector of the second IGBT 112, and the anode of the second diode 110 is connected to the first connection terminal 104A. In an alternative not shown, the cathode of the second diode 110 is connected to the second connection terminal 104B, the transmitter of the second IGBT 112 is connected to the anode of the second diode 110, and the collector of the second IGBT 112 is connected to the first connection terminal 104A.

According to one alternative embodiment shown in FIG. 6, each cell 98 is replaced by a member 114. The member 114 includes two arms 116A, 116B, an IGBT 118, and a varistor 120.

The two arms 116A, 116B are connected to each other at two connection terminals 122A, 122B.

A first connection terminal 122A of the member 114 is similar to the first connection terminal 104A of the cell 98. A second connection terminal 122B of the member 114 is similar to the second connection terminal 104B of the cell 98.

A first arm 116A comprises two first diodes 124 connected in series by their respective cathodes at a first connection point 126. A second arm 116B comprises two second diodes 128 connected in series by their respective anodes at a second connection point 130.

The collector, respectively the transmitter of the IGBT 118 is connected at the first connection point 126, the second connection point 130, respectively. The varistor 120 is connected in parallel with the IGBT 118.

Alternatively or additionally, each varistor 100, 120 is replaced by any nonlinear electrical component, such as a trisil diode, a transil diode, a low current caliber fuse, a nonlinear metal resistance, a resistance with a positive temperature coefficient, or a component formed by a combination of these elements. Also alternatively, each varistor 100, 120 is replaced by a unit formed by a nonlinear electrical component of the aforementioned type and a capacitor to assist with switching, connected in parallel with the component.

Alternatively or additionally, each IGBT 108, 112, 118 is replaced by any semiconductor electronic component comprising a control electrode and two conduction electrodes, such as a bipolar transistor, a field effect transistor, a thyristor, a gate turnoff thyristor, an IGCT (Insulated Gate-Commutated Thyristor), or a MCT (MOS Controlled Thyristor), for example.

Alternatively, each cell 98 is replaced by a hybrid assisted turnoff switch 54. According to this alternative embodiment, the first connection terminal 63A of the switch 54 is similar to the first connection terminal 104A of the cell 98 and the second connection terminal 63B of the switch 54 is similar to the second connection terminal 1048 of the cell 98.

According to the second embodiment, the control means 48 further advantageously include three modules 134 for detecting an electrical overcurrent. As shown in FIG. 5, each module 134 is connected to the processor 74 on the one hand, and the measuring member 44 on the other hand.

Each module 134 is capable of determining the sign of the signals $I_{mesU}$, $I_{mesV}$, $I_{mesW}$, $D_{mesU}$, $D_{mesV}$, $D_{mesW}$ provided by the associated measuring member 44. Each module 134 is further capable of comparing the sign of the signal $I_{mesU}$, $I_{mesV}$, $I_{mesW}$ provided by the associated measuring member 44 with the sign of the signal $D_{mesU}$, $D_{mesV}$, $D_{mesW}$ provided by that same measuring member 44. Each module 134 is also capable of acquiring the instantaneous state of the first switches 37 of the associated switching branch 30. Each module 134 is further capable of providing the processor 74 with a signal $I_{détecU}$, $I_{détecV}$, $I_{détecW}$ capable of assuming two distinct values. One of the two values of each signal $I_{détecU}$, $I_{détecV}$, $I_{détecW}$ indicates normal operation of the associated switching branch 30. The other value of each signal $I_{détecU}$, $I_{détecV}$, $I_{détecW}$ indicates the detection of an overcurrent of an electrical current circulating in at least one of the diodes 38 of the associated switching branch 30.

Figure 7:
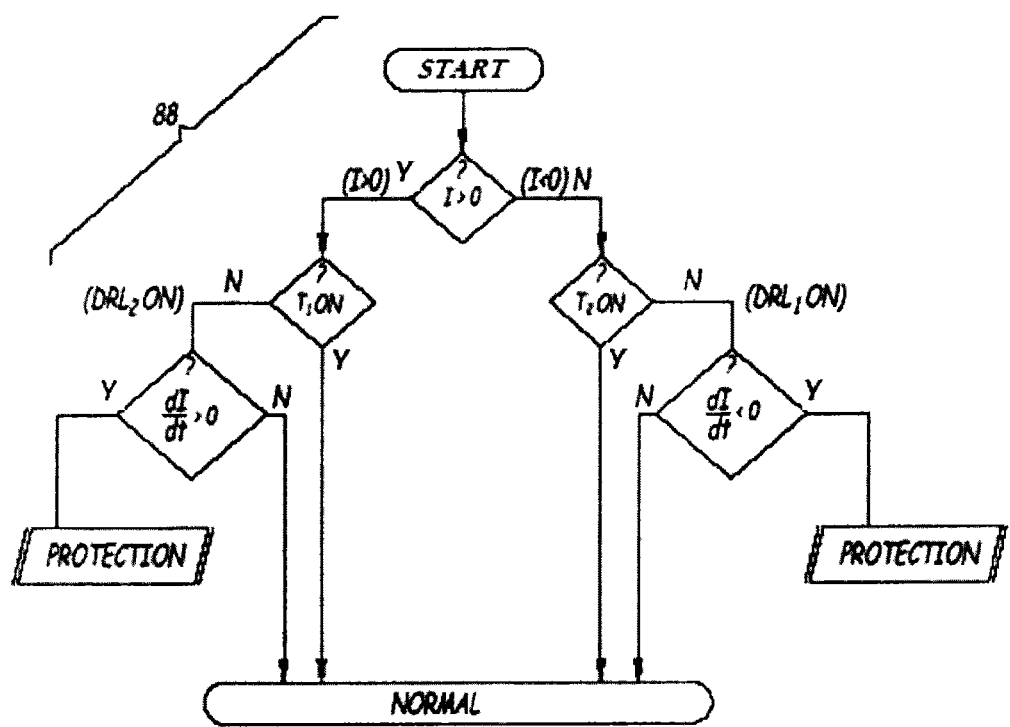
FIG. 7 is a flowchart illustrating one step of the control method of FIG. 4.

Each module 134 is for example formed by a programmed and/or analog module and is capable of carrying out the operations shown in the flowchart of FIG. 7, as outlined hereafter.

The processor 74 is capable of sending a control order to the control member 78, the control order being capable of assuming two distinct values. The value of the control order is determined by applying an "OR" logic function to the three signals $I_{détecU}$, $I_{détecV}$, $I_{détecW}$. The first value of the control order for example corresponds to an opening command for one of the second electronic switches 96, the second value corresponding to a closing command of all of the second electronic switches 96. Alternatively, the first value of the control order corresponds to a simultaneous opening command of the three electronic switches 96.

The control member 78 is capable of sending a control signal to each second electronic switch 96.

The operation of the protection device 21 according to the second embodiment will now be explained.

The wired connection 35U will be considered hereinafter, as well as the switching branch 30, the second switch 96, the measuring member 44 and the module 134 associated with that wired connection 35U.

During the initial step 84, the member 44 measures the intensity of the current circulating in the wired link 35U, as well as the derivative of that intensity.

During the following step 86, the measuring member 44 sends the signal $I_{mesU}$ and the signal $D_{mesU}$ to the module 134.

During a following step, the control means 48 control the second electronic switch 96 based on the value of the signals $I_{mesU}$ and $D_{mesU}$.

More particularly, during the first sub-step 88 illustrated in FIG. 7, the module 134 determines the sign of the signal $I_{mesU}$ and the sign of the signal $D_{mesU}$. The module 134 further acquires the instantaneous state of the first switches 37 of the switching branch 30.

In FIG. 7, the first switch 37 of the first half-branch 32A is called "switch T1", the first switch 37 of the second half-branch 32B is called "switch T2", the diode 38 of the first half-branch 32A is called "diode DRL1", and the diode 38 of the second half-branch 32B is called "diode DRL2". Furthermore, in this figure, the signal $I_{mesU}$ is called "I", and the signal $D_{mesU}$ is called "dI/dt".

If the sign of the signal $I_{mesU}$ is positive, and if the switch T1 is in the off state, the module 134 compares the sign of the signal $I_{mesU}$ to the sign of the signal $D_{mesU}$. If the signals $I_{mesU}$ and $D_{mesU}$ have the same sign, in other words if the signal $D_{mesU}$ has a positive sign, the module 134 sends the processor 74 the signal $I_{détecU}$, the value of which indicates the detection of an overcurrent of an electrical current circulating at least in the diode DRL2. The processor 74 then sends the opening control order for the second switch 96 to the control member 78.

If the sign of the signal $I_{mesU}$ is positive and the switch T1 is in the on state, or if the sign of the signal $I_{mesU}$ is positive, the switch T1 is in the off state and the signals $I_{mesU}$ and $D_{mesU}$ have opposite signs, the module 134 sends the processor 74 the signal $I_{détecU}$, the value of which indicates normal operation of the switching branch 30.

If the sign of the signal $I_{mesU}$ is negative, and if the switch T2 is in the off state, the module 134 compares the sign of the signal $I_{mesU}$ to the sign of the signal $D_{mesU}$. If the signals $I_{mesU}$ and $D_{mesU}$ have the same sign, in other words if the signal $D_{mesU}$ is negative, the module 134 sends the processor 74 the signal $I_{détecU}$, the value of which indicates the detection of an overcurrent of an electrical current circulating at least in the diode DRL1. The processor 74 then sends the opening control order of the second switch 96 to the control member 78.

If the sign of the signal $I_{mesU}$ is negative and the switch T2 is in the on state, or if the sign of the signal $I_{mesU}$ is negative, the switch T2 is in the off state and the signals $I_{mesU}$ and $D_{mesU}$ have opposite signs, module 134 sends the processor 74 the signal $I_{détecU}$, the value of which indicates normal operation of the switching branch 30.

During the second sub-step 90, if the value of the signal $I_{détecU}$ indicates the detection of an overcurrent of an electrical current, the control member 78 emits the opening control signal for the second switch 96. Under the action of the control signal, the second switch 96 then goes from its on state to its off state. The fault current then no longer circulates in either of the two diodes 38 of the branch 30. Furthermore, during that same second sub-step 90, the control member 78 emits a forced opening signal to the first electronic switches 37 of the switching branch 30.

In the alternative according to which the first value of the control order corresponds to a simultaneous opening command of the three second electronic switches 96, during the second sub-step 90, the control member 78 sends each of the three second electronic switches 96 an opening control signal. Under the action of the control signal, the three second electronic switches 96 then simultaneously go from their on state to their off state. The fault current then no longer circulates in any of the diode 38 of the inverter 16. Furthermore, during the same second sub-step 90, the control member 78 emits a forced opening signal to each of the first electronic switches 37 of the inverter 16.

In an alternative that is not shown, the control means 48 do not include detection modules 134 and the measuring members 44 are connected directly to the processor 74. According to this alternative, the memory 76 is capable of storing a reference intensity value, for example an intensity value substantially equal to the peak value of the intensity of the rated current capable of circulating in each first switch 37. Furthermore, the processor 74 is capable of comparing the value of each signal $I_{mesU}$, $I_{mesV}$, $I_{mesW}$ to the reference intensity value and sending the control order to the control member 78. The value of the control order is determined by the result of the comparison between each signal $I_{mesU}$, $I_{mesV}$, $I_{mesW}$ and the reference intensity. For example, the value of the control order is equal to the first value if the value of one of the signals $I_{mesU}$, $I_{mesV}$, $I_{mesW}$ is greater than the value of the reference intensity. During operation, during the first sub-step 88, the processor 74 compares the value of the signal $I_{mesU}$ to the reference value stored in the memory 76. If the value of the signal $I_{mesU}$ is greater than the value of the reference intensity, the processor 74 sends the control member 78 the opening control order for the second switch 96 associated with the wired link 35U. The rest of the operation of the protection device 21 according to this alternative embodiment is similar to that of the protection device 21 according to the example embodiment of the second embodiment previously described.

In the different alternatives of the second embodiment described above, only one measuring member 44 is necessary per phase of the output current of the inverter 16. This makes it possible to reduce the production costs, in particular relative to the third embodiment described below. Furthermore, via the measuring signal it provides, each measuring member 44 allows the detection, for each diode 38 of the associated branch 30, of any overcurrent of the current circulating within that diode 38. Furthermore, the signals $D_{mesU}$, $D_{mesV}$, $D_{mesW}$ are not disrupted by the switching fronts of the diodes 38, unlike the third embodiment described below.

Alternatively, the measuring means 20 comprise a number N3 of measuring members 44, where N3 is the number of switching half-branches 32A, 32B. The N3 measuring members 44 are shown in dotted lines in FIG. 5. Each measuring member 44 is arranged at a switching half-branch 32A, 32B, on the antiparallel connection of the respective diode 38. According to this alternative embodiment, each measuring member 44 is capable of measuring the intensity of the current circulating in the associated diode 38. Additionally, each measuring member 44 is further advantageously capable of measuring the derivative of the intensity of the current circulating in the associated diode 38. The measuring means 20 are thus capable of performing a direct measurement of the current capable of circulating in each diode 38 of each branch 30. According to this alternative embodiment, the control means 48 advantageously comprise N3 detection modules 134 for detecting an electrical overcurrent, each module 134 being connected to the processor 74 on the one hand, and to a measuring member 44 on the other hand. Each module 134 is capable of providing the processor 74 with a signal capable of assuming two distinct values. One of the two values of each signal indicates a normal operation of the associated switching half-branch 32A, 32B. The other value of each signal indicates the detection of an overcurrent of an electrical current circulating in the associated diode 38. The operation of the protection device 21 according to this alternative embodiment is similar to that of the protection device 21 according to the example embodiments of the second embodiment previously described.

Alternatively, the measuring means 20 comprise a single measuring member 44 similar to that of the first embodiment, and shown in dotted lines in FIG. 5. According to this alternative, the control means 48 do not include modules 134. The operation of the measuring member 44 and the associated control means 48 having been described previously, it will not be described in more detail for this alternative embodiment.

The advantages of the second embodiment of the conversion system 10 are identical, regarding the protection device 21, to those of the first embodiment, and are therefore not described again.

Figure 8:
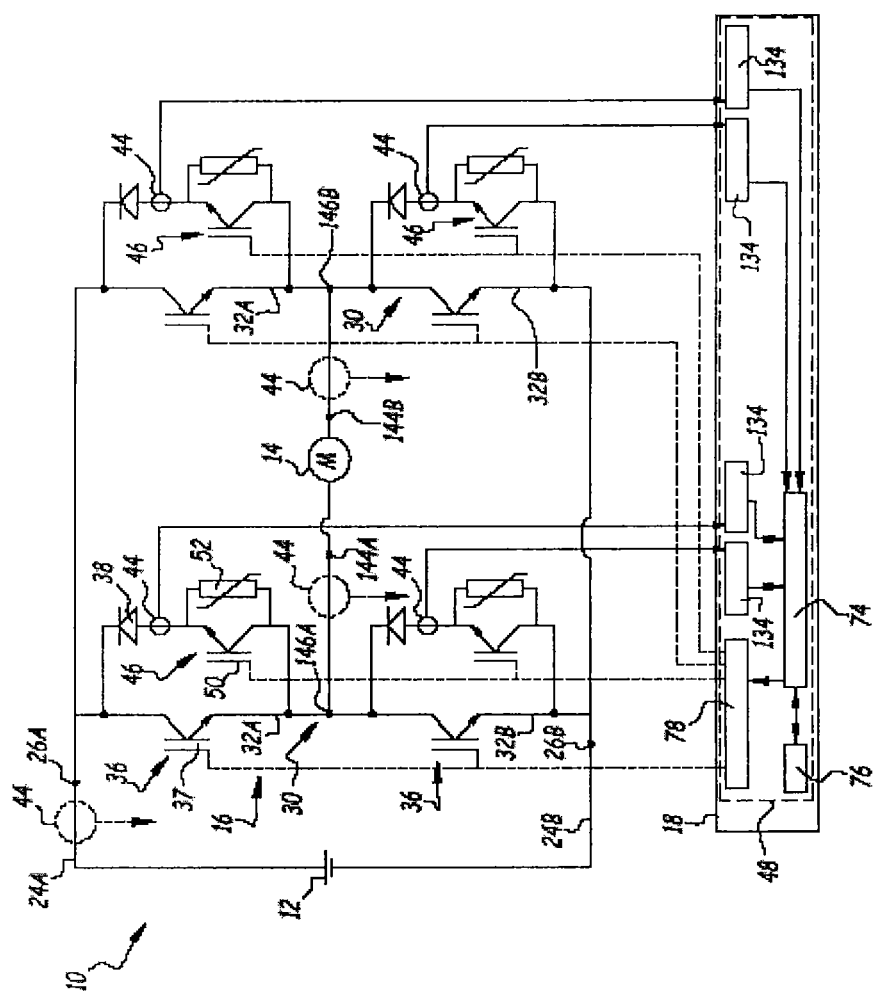
FIG. 8 is a view similar to that of FIG. 2 according to a third embodiment of the invention.

FIG. 8 illustrates a third embodiment of the invention, for which the elements similar to the first embodiment, previously described, are identified using identical references, and are therefore not described again.

Unlike the first and second embodiments, the load 14 is a DC electric motor. Furthermore, according to this example embodiment, the converter 16 is a voltage chopper capable of converting an input DC voltage into an output DC voltage, and the conversion system 10 is a system for converting an input DC voltage into an output DC voltage. More particularly, according to this example embodiment, the converter 16 is a four-quadrant full bridge control voltage chopper, known in itself.

The voltage chopper 16 includes a positive input terminal 26A, a negative input terminal 26B, a first output terminal 144A and a second output terminal 144B.

In a known manner, the voltage chopper includes, for each output terminal 144A, 144B, a switching branch 30 connected between the input terminals 26A, 26B. Each switching branch 30 comprises two switching half-branches 32A, 32B serially connected at a respective intermediate terminal 146A, 146B. The voltage chopper 16 thus includes two intermediate output terminals 146A, 146B.

The measuring means 20 comprise four measuring members 44. Each measuring member 44 is arranged at a switching half-branch 32A, 32B, on the antiparallel connection of a respective diode 38.

Each measuring member 44 is capable of measuring the intensity of the current circulating in the associated diode 38. Additionally, each measuring member 44 is further advantageously capable of measuring the derivative of the intensity of the current circulating in the associated diode 38.

Alternatively, the measuring means 20 comprise a measuring member 44, shown in dotted lines on the left in FIG. 8. The measuring member 44 is arranged between the DC source 12 and the positive input terminal 26A, on the positive DC voltage bus 24A. In an alternative that is not shown, the measuring member 44 is arranged between the DC source 12 and the negative input terminal 26B, on the negative DC voltage bus 24B.

Also alternatively, the measuring means 20 comprise two measuring members 44, shown in dotted lines at the center of FIG. 8. Each measuring member 44 is arranged between a respective intermediate output terminal 146A, 146B and an associated output terminal 144A, 144B.

The protection device 21 comprises four second electronic switches 46. More specifically, the protection device 21 comprises, for each switching branch 30, two second electronic switches 46, each second electronic switch 46 being serially connected with the diode 38 of a respective switching half-branch 32A, 32B.

In an alternative that is not shown, the protection device 21 comprises two separate electronic switches 46. More specifically, according to this alternative embodiment, the protection device 21 comprises, for each switching branch 30, a second electronic switch 46. Each second electronic switch 48 is for example serially connected with the diode 38 of one of the first switching half-branches 32A. Alternatively, each second electronic switch 46 is serially connected with the diode 38 of one of the second switching half-branches 32B.

In the example embodiment of FIG. 8, the control means 48 advantageously comprise four modules 134 for detecting an electrical overcurrent, each module 134 being connected to the processor 74 on the one hand, and to a measuring member 44 on the other hand. Each module 134 is capable of providing the processor 74 with a signal capable of assuming two distinct values. One of the two values of each signal indicates normal operation of the associated switching half-branch 32A, 32B. The other value of each signal indicates the detection of an overcurrent of an electrical current circulating in the associated diode 38.

In one alternative that is not shown, the control means 48 do not include detection modules 134 and the measuring members 44 are directly connected to the processor 74, as previously described.

The operation of this third embodiment of the protection device 21 is similar to that of the second embodiment regarding the measuring means 20 and the control means 48, and that of the first embodiment regarding the second electronic switches 46. The operation of this third embodiment is therefore not described in more detail.

The advantages of the third embodiment of the conversion system 10 are identical, regarding the protection system 21, to those of the first embodiment, and are therefore not described again.

One can see that the protection device according to the invention makes it possible to protect each diode of each branch against an electrical overcurrent, while having an improved activation speed and substantially preserving the output of the branches.

The protection device according to the invention furthermore makes it possible to advantageously replace the so-called "day-night" traditional contactors used on the electrical network side in photovoltaic energy conversion systems, these contactors aiming to protect the voltage inverter when the input DC voltage is lower than the peak voltage of the network. This makes it possible to decrease the production costs related to the presence of such contactors and also to increase the handling endurance.

Furthermore, the protection device according to the invention may advantageously be used as load shedding means for the voltage inverter. In other words, in the context of load shedding protection implemented on the electrical network side, the protection device may act as an opening member for the power supply chain, thereby making it possible to disconnect the electrical power supply source from the network.

Using the protection device according to the invention further makes it possible to use a breaker to secure the electrical power supply chain. A protection device according to the invention advantageously makes it possible, before opening the breaker, to cancel any fault current detected by the voltage inverter, without deterioration of the breaker.

In the three embodiments previously described, the measuring means 20 are capable of measuring the intensity of the current circulating in one of the DC voltage buses 24A, 24B, or the intensity and/or the derivative of the intensity of a current circulating in each wired link 35U, 35V, 35W, or the intensity and/or the derivative of the intensity of the current circulating in each diode 38. Alternatively, the measuring means 20 are capable of measuring a difference in potential between the voltage of the DC voltage buses 24A, 24B and the peak voltage of the load 14. This measurement is an indirect measurement of the current capable of circulating in each diode 38 of each branch 30. In fact, if the voltage of the buses 24A, 24B, corresponding to the input voltage of the converter 16, is below the peak voltage of the load 14, this means that a fault current is circulating in at least two diodes 38 belonging to two distinct switching branches 30.

Also alternatively, each derivative of the intensity of an aforementioned current is not measured by the measuring means 20, but is determined by the processor 74 from the measurement of the associated current intensity.

The description of the first two embodiments was provided in reference to "single-level" inverters. It is, however, understood that the invention applies in the same manner to "multilevel" inverters, for example inverters having a neutral point piloted (NPP) topology, or a neutral point clamped (NPC) topology.

More generally, the invention applies to any system for converting a first electrical voltage into a second electrical voltage of the "step down" type, i.e., in rated operation, the input voltage of the system is greater than the output voltage of the system.

The invention claimed is:

1. A protection device for protecting against an electrical overcurrent, for at least one electronic switching branch of an electrical conversion system, the at least one electronic switching branch comprising two switching half-branches serially connected at an intermediate terminal, at least one half-branch including at least one switching member, the at least one switching member comprising a first electronic switch and a diode connected in antiparallel to said first electronic switch, wherein the device includes, for the at least one electronic switching branch:
    circuitry including at least one second electronic switch, the at least one second electronic switch being connected to the intermediate terminal or to an electrode of said diode connected in antiparallel to the first electronic switch, the at least one second electronic switch being able to switch, under an action of a controller, from an on state to an off state to protect said diode from the electrical overcurrent, the diode and the at least one second electronic switch are connected in series between conduction electrodes of the first electronic switch,
    the circuitry configured to measure at least one magnitude relative to a current able to circulate in the diode of the at least one electronic switching branch, and
    control the at least one second electronic switch, based on the at least one magnitude measured, wherein the at least one second electronic switch is serially connected to a respective diode, and connected in antiparallel to a first respective electronic switch.

2. The device according to claim 1, wherein the at least one second electronic switch includes a semiconductor electronic switching component, and a nonlinear electrical component connected in parallel to said semiconductor switching component.

3. The device according to claim 1, wherein the at least one second electronic switch includes a nonlinear electrical component, and two arms each connected in parallel to the nonlinear electrical component, each arm including a semiconductor electronic switching component, and a diode serially connected to the semiconductor switching component.

4. The device according to claim 1, wherein the at least one second electronic switch includes two arms, a first arm comprising two diodes serially connected by their respective cathodes at a first connection point, a second arm comprising two diodes serially connected by their respective anodes at a second connection point, and the at least one second electronic switch further includes a nonlinear electrical component connected between the first and second connection points, and a semiconductor electronic switching component, the semiconductor electronic switching component being connected in parallel with the nonlinear electrical component.

5. The device according to claim 1, wherein the at least one second electronic switch includes two arms, a first arm comprising two diodes serially connected by their respective cathodes at first connection point, a second arm comprising two diodes serially connected by their respective anodes at a second connection point, and the at least one second electronic switch further includes a nonlinear electrical component connected between the first and second connection points, a mechanical contactor, connected in parallel with the nonlinear electrical component, and a semiconductor electronic switching component connected in parallel with the nonlinear electrical component.

6. A system for converting a first electrical voltage into a second electrical voltage, the system comprising:
   a converter for converting the first electrical voltage into the second electrical voltage, the converter comprising at least two input terminals, at least two output terminals, and at least one electronic switching branch connected between the at least two input terminals, the at least one electronic switching branch comprising two switching half-branches serially connected at an intermediate terminal, at least one half-branch including at least one switching member, the at least one switching member comprising a first electronic switch and a diode connected in antiparallel with said first electronic switch;
   a control device for controlling the first electronic switch of the at least one electronic switching branch; and
   the protection device according to claim 1.

7. A method for controlling a protection device, the protection device being capable of protecting at least one electronic switching branch of an electrical conversion system against an electrical overcurrent, the at least one electronic swiching branch comprising two switching half-branches serially connected at an intermediate terminal, at least one half-branch including at least one switching member, the at least one switching member comprising a first electronic switch and a diode connected in antiparallel with said first electronic switch, the protection device comprising, for the at least one electronic switching branch, at least one second electronic switch connected to the intermediate terminal or to an electrode of said diode connected in antiparallel with the first electronic switch, the at least one second electronic switch being capable of switching, under an action of a command, from an on state to an off state to protect said diode against the electrical, overcurrent, the diode and the at least one second electronic switch are connected in series between conduction electrodes of the first electronic switch, wherein the method comprises, for the at least one second electronic switch, the following steps:
   measuring, for the diode being protected by the at least one second electronic switch, at least one magnitude relative to a current circulating in the diode; and
   controlling the at least one second electronic switch based on the at least one magnitude measured, wherein the at least one second electronic switch is serially connected to a respective diode, and connected in antiparallel to a first respective electronic switch.

8. The method according to claim 7, wherein the step for controlling the at least one second electronic switch comprises:
   comparing the at least one magnitude measured to a predetermined reference magnitude; and
   emitting a control signal to open or close the at least one second electronic switch based on a result of the comparison.

9. The method according to claim 8, wherein during the measuring step, the measurement is a direct measurement of an intensity of the current circulating in the diode of the at least one electronic switching branch, in that the comparison step includes a comparison between a value of the measured intensity of the current circulating in the diode and a value of a reference intensity, and, during the emitting step, emitting the control signal to open the a least one second electronic switch when a deviation between the value of the measured intensity of the current circulating and the value of the reference intensity is above a predetermined gap.

10. The method according to claim 9, wherein during the measuring step, the measurement is a measurement of the intensity of the current circulating in the diode of the at least one electronic switching branch and a derivative of the intensity of the current circulating in the diode of the at least one electronic switching branch, in that the comparison step includes a comparison between a sign of a value of the intensity of the circulating in the diode and a sign of a value of the derivative of the intensity of the current circulating in the diode, and in that, during the emitting step, emitting the control signal to open the at least one second electronic switch when the value of the intensity of the current circulating and the value of the derivative of the intensity of the current circulating have the same sign.

11. The method according to claim 8, wherein during the measuring step, the measurement is a measurement of an intensity of the current circulating in the diode of the at least one electronic switching branch, via a measurement of an intensity of a main current comprising the current circulating in said diode, and the comparison step includes a comparison between a value of the measured intensity of the main current and a zero value.

12. The method according to claim 8, wherein the control signal is sent to the at least one second electronic switch, and is capable of commanding a simultaneous opening of all second electronic switches of the electrical conversion system.

13. The method according to of claim 8, wherein when the control signal is emitted to open the at least one second electronic switch, the control step further comprises emitting a forced opening control signal to one or more first electronic switches.

14. A protection device for protecting against an electrical overcurrent, for at least one electronic switching branch of an electrical conversion system, the at least one electronic switching branch comprising two switching half-branches serially connected at an intermediate terminal, at least one half-branch including at least one switching member, the at least one switching member comprising a first electronic switch and a diode connected in antiparallel to said first electronic switch, wherein the device includes, for the at least one electronic switching branch:
   circuitry including at least one second electronic switch, the at least one second electronic switch being connected to the intermediate terminal or to an electrode of said diode connected in antiparallel to the first electronic switch, the least one second electronic switch being able to switch, under an action of a controller, from an on state to an off state to protect said diode from the electrical overcurrent, the circuitry configured to measure at least one magnitude elative to a current able to circulate in the diode of the at least one electronic switching branch, and control the at least one second electronic switch, based on the at least one magnitude measured, wherein the at least one second electronic switch is serially connected to a respective diode, and connected in antiparallel to a first respective electronic switch, wherein the at least one second electronic switch is connected to the intermediate terminal of the at least one electronic switching branch and to an output terminal of the electrical conversion system.

15. A method for controlling a protection device, the protection device being capable of protecting at least one electronic switching branch of an electrical conversion system against an electrical overcurrent, the at least one electronic switching branch comprising two switching half-branches serially connected at an intermediate terminal, at least one half-branch including at least one switching member, the at least one switching member comprising a first electronic switch and a diode connected in antiparallel with said first electronic switch, the protection device comprising, for the at least one electronic switching branch, at least one second electronic switch connected to the intermediate terminal or to an electrode of said diode connected in antiparallel with the first electronic switch, the at least one second electronic switch being capable of switching, under an action of a command, from an on state to an off state to protect said diode against the electrical overcurrent, wherein the method comprises, for the at least one second electronic switch, the following steps;

measuring, for the diode being protected by the at least one second electronic switch, at least one magnitude relative to a current circulating in the diode; and controlling the at least one second electronic switch based on the at least one magnitude measured, wherein the at least one second electronic switch is connected to the intermediate terminal of the at least one electronic switching branch and to an output terminal of the electrical conversion system.

* * * * *